Jan. 26, 1960
B. F. BURNER
2,922,319
DIFFERENTIAL MECHANISM
Filed Aug. 6, 1956
3 Sheets-Sheet 3
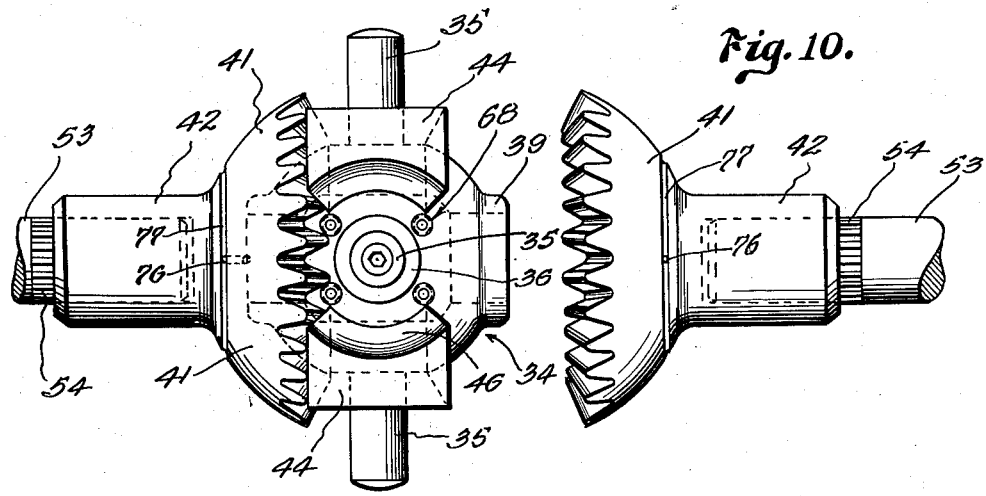
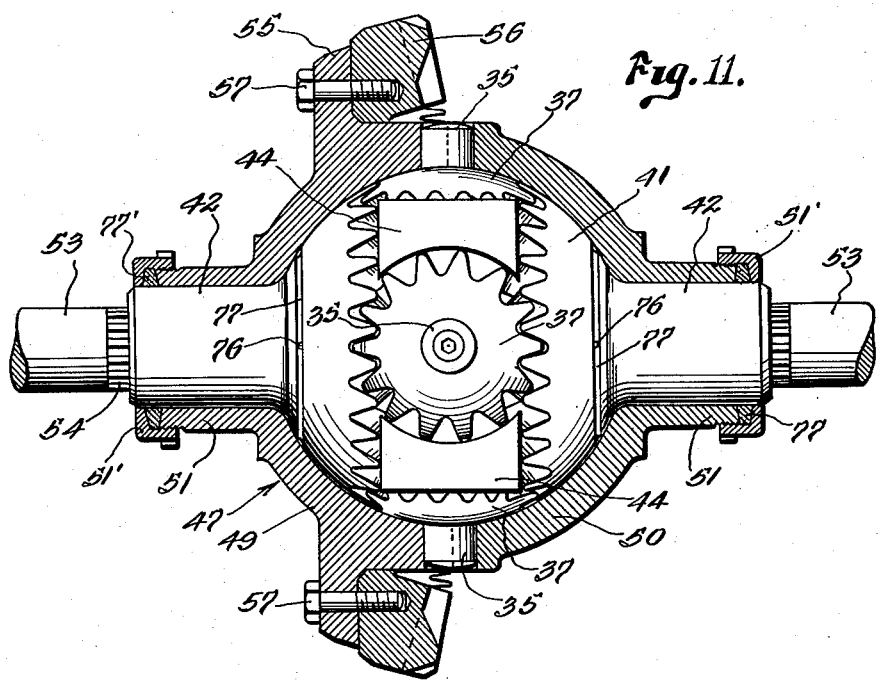
INVENTOR.
Bingham F. Burner
BY
Shoemaker & Mattare
ATTORNEYS United States Patent Office 2,922,319
Patented Jan. 26, 1960

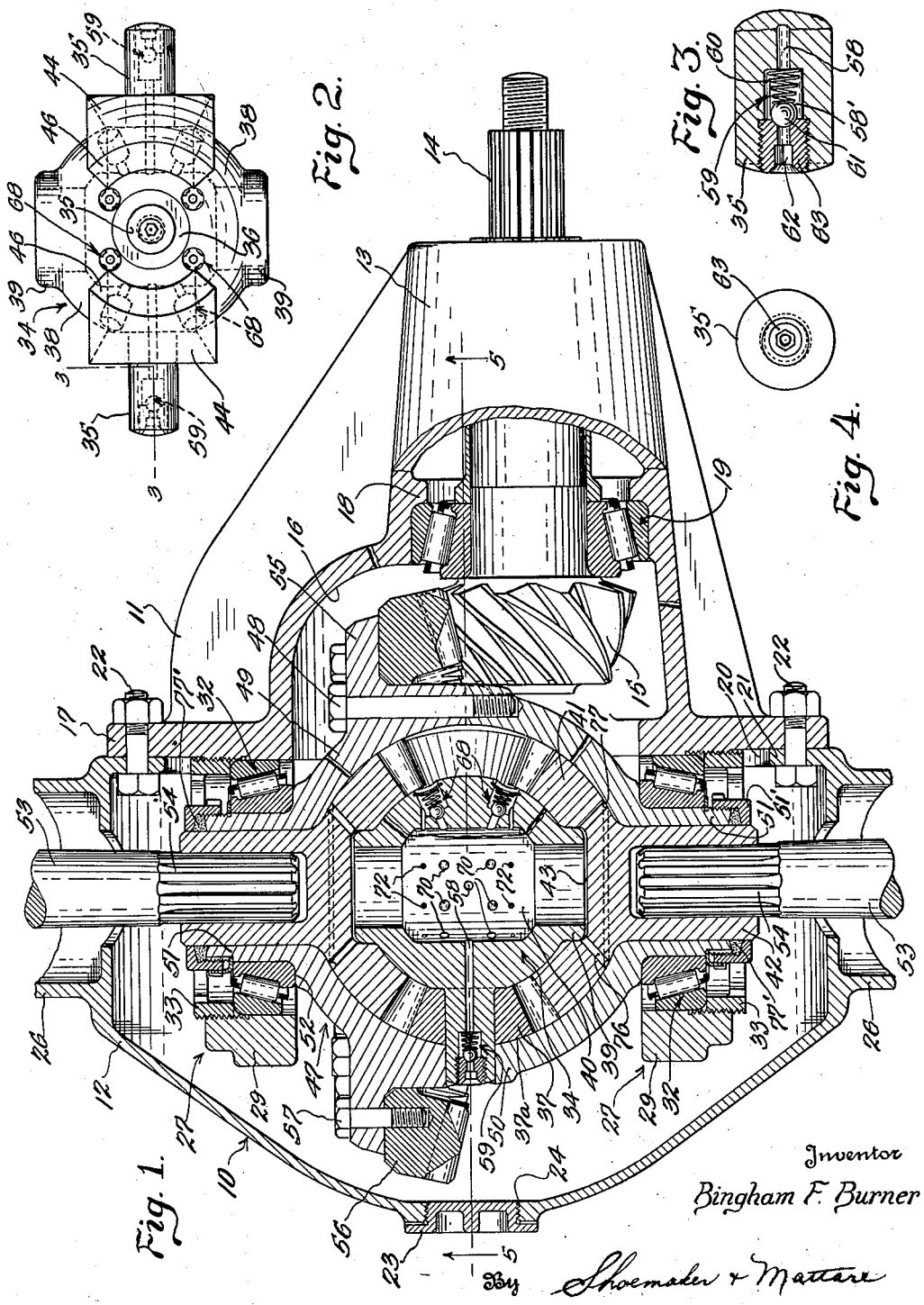

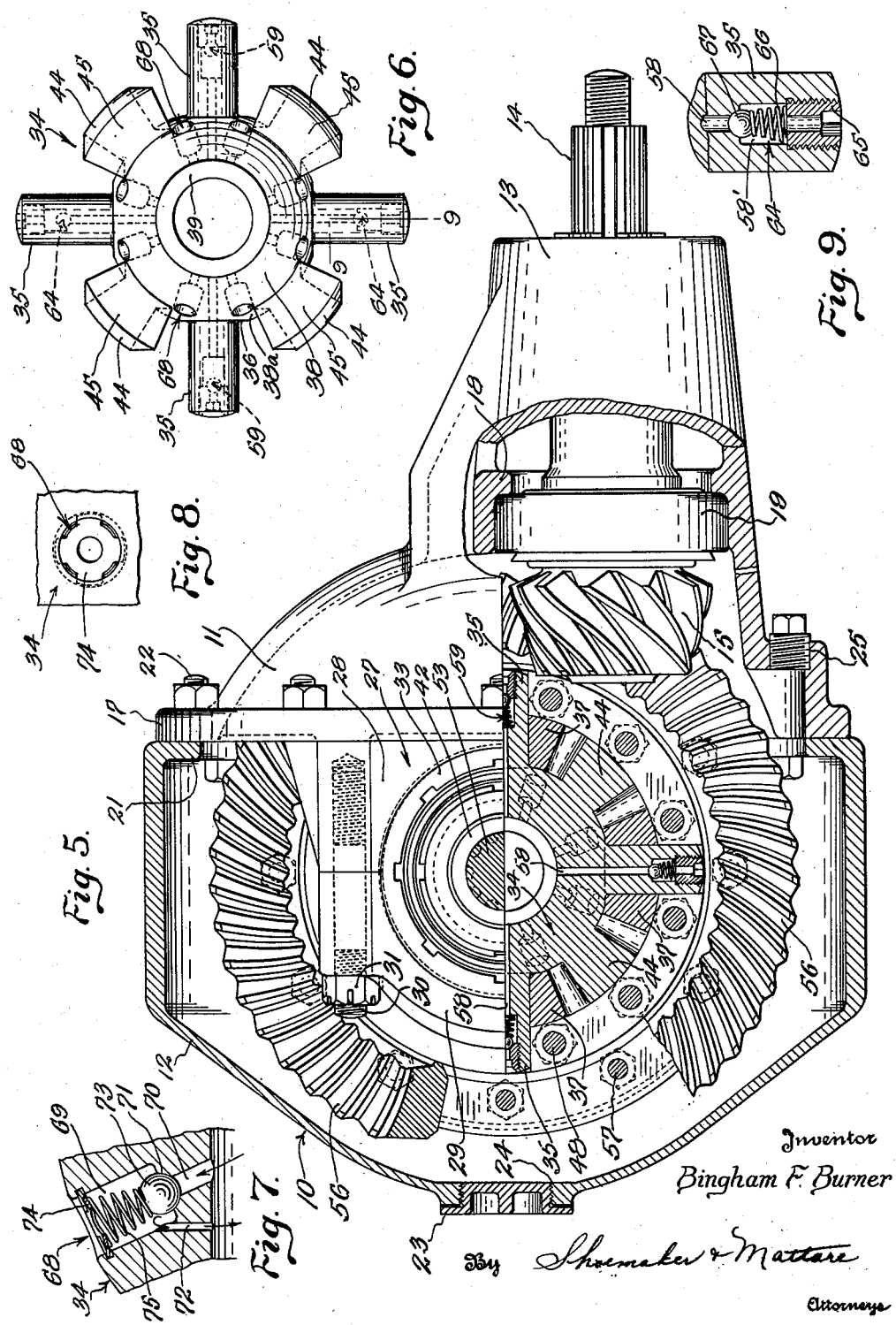

2,922,319

DIFFERENTIAL MECHANISM

Bingham F. Burner, Arlington, Va.

Application August 6, 1956, Serial No. 602,289

8 Claims. (Cl. 74—711)

This invention relates to improvements in differential drive mechanism and it is a primary object of the present invention to provide an improved form of differential drive by means of which there is eliminated the usual wheel spinning common to conventional differentials when the driving wheels of the motor vehicle in which the present drive mechanism is installed are required to operate in mud, sand, snow and on ice or on wet roads, as a result of which maximum possible tractive effort will be obtained and each wheel will contribute its full share of rim-pull to the limit of its tractional resistance.

Another object of the invention is to provide an improved differential mechanism whereby the foregoing objects are attained and wherein necessary differential action is permitted as required for turning and rounding curves.

Still another object of the invention is to provide a differential mechanism designed to attain the foregoing objects wherein the sun and planetary gears of the mechanism function as fluid pumps to move fluid from a reservoir through a restricted passage or orifice whereby to prevent the free spinning of one wheel with respect to the other when the said one wheel is on a slippery surface so that continued rotation and tractive effort will be obtained from the other wheel, as a result of which the stalling of the motor vehicle is prevented.

A still further object of the invention is to provide a differential mechanism of the above described character which avoids the use of any type of toothed locking coupling aside from the usual sun and planetary bevel gears, but effects the desired yielding locking coupling by fluid means which is pumped by the gears when differential rotation of the same occur, through restricted passageways, thereby preventing the free spinning or rotation of one axle shaft relative to the other under certain conditions.

The invention will be best understood from a consideration of the following detailed description taken in connection with the accompanying drawings forming a part of the specification, with the understanding, however, that the invention is not to be understood as limited to the exact details of construction shown and described since obvious modifications will occur to a person skilled in the art.

In the drawings:

Figure 1 is a central horizontal section through a differential mechanism constructed in accordance with the present invention, showing portions only of the wheel axles with which the mechanism is coupled, the plane of section being dropped at the forward side of the differential rotor to show two pump ports, the adjacent planetary gear being removed.

Figure 2 is a view in elevation of the rotor as seen when looking transversely of the axis of rotation.

Figure 3 is a sectional detail taken substantially on the line 3—3 of Figure 2.

Figure 4 is an end view of one of the quadriradiate pins of which Figure 3 is a section.

Figure 5 is a sectional view taken in part on the line 5—5 of Figure 1, a portion of the differential housing being in elevation together with a journal and the drive pinion bearing.

Figure 6 is a view of the rotor looking at the same along its axis of rotation or at right angles to the view forming Figure 2.

Figure 7 is a fragmentary section on an enlarged scale of a pump port.

Figure 8 is a view looking into a pump port from the outer end.

Figure 9 is a sectional view on an enlarged scale taken substantially on the line 9—9 of Figure 6.

Figure 10 is a view in elevation of the rotor body showing the relative positions with respect thereto of the two sun gears, one of the sun gears being shifted away from the rotor body.

Figure 11 is a view in elevation of the rotor body and the sun and planet gears thereon and showing the incasing housing in section.

Referring now more particularly to the drawings the numeral 10 generally designates the differential housing. This housing is divided into the forward and rear sections 11 and 12 respectively. The forward section of the differential housing has the reduced sleeve portion 13 through which extends the drive pinion shaft 14, the rear end of this shaft carrying the drive pinion 15. The rear part of the differential housing portion 11 is enlarged to provide the chamber 16 in which the drive pinion 15 is positioned and encircling this chamber portion is the flange plate 17 by means of which the forward portion of the housing is secured to the rear portion.

The chamber 16 opens rearwardly and where the chamber joins the sleeve 13 suitable means is provided as indicated at 18 to form a seat for a bearing unit which is generally designated 19 and here shown as being in the form of a roller bearing. The rear end of the drive pinion shaft 14 adjacent to the pinion 15 passes through and is mounted in the bearing 19 in the manner shown and it will be understood that the forward end of the sleeve 13 is closed around the shaft 14 by the usual oil seal, not shown, which is pressed into the forward end of the sleeve 13.

The rear section 12 of the differential housing has an opening 20 at the front side which is bordered by the flange 21. This flange bears against the rear face of the flange plate 17 and the two sections are secured together by the bolts 22 which pass through the flange and flange plate.

The rear wall of the section 12 is dome shaped to conform to the general outlines of the mechanism within the housing and at the center of this rear wall is the removable plug 23 which closes the opening 24 through which access is had to the interior of the housing for the purpose hereinafter described.

The differential housing is designed to contain a suitable quantity of grease for lubrication of the moving parts, as is customary and means is provided in the form of the plugged opening 25 at the lower part of the forward section 11 of the housing, for draining the latter.

Opposite sides of the rear section 12 of the housing are formed to provide the transversely aligned oppositely and laterally extending axle housings 26.

At opposite sides of the rearwardly opening chamber 16 of the forward housing section 11 are journals, each of which is generally designated 27 and each of which comprises the fixed half or post 28 which is integral with the flange plate 17, and the removable half or cap 29 which is secured to the post by the stud screws 30 and nuts 31.

Each of the journals 27 has mounted therein a bearing unit which is generally designated 32 and these units are retained in position against outward or separatory movement by the ring nut 33 which threads into the outer portion of the journal as is clearly shown in Figure 1. As is also shown in this figure the bearings, which are here illustrated as of the roller type, are coaxial one with the other and with the axle housings 26.

The differential structure of the present invention comprises a central core unit which may be generally termed the rotor and which is generally designated 34. Two aspects of this core or rotor unit 34 are shown in Figures 2 and 6 of the drawings.

The rotor body 34 has the quadri-radiate pins 35 springing from circular flat faces 36, the planes of which are normal to each of these pins.

Freely revolvable on each pin 35 is a planet bevel gear 37, the pins 35 extending through these gears into a rotor case, hereinafter described, and the gears being finished with spherical outer sides 37a having a common center with the radii of the pins in the axis of the rotor.

The rotor 34 has spherical end surfaces 38 and continuations of the surfaces around the flats 36, as indicated at 38a.

Extending perpendicular to the pins 35 and forming an integral part of the rotor body, are the axially directed or end hubs 39 which hubs are of short length as is clearly shown in Figures 1 and 2. These hubs 39 are tubular and they lead into a central fluid reservoir chamber 40 within the body of the rotor, this reservoir chamber 40 being cylindrical and coaxial with the hubs 39 as shown in Figure 1.

Meshed with the planet gears 37 at the ends of the rotor, are the bevel sun gears 41, each of which has the integral hub 42 which is hollow from its outer end through the major portion of its length as shown in Figure 1. As will be clearly seen from this figure the inner faces of the sun gears are of concave spherical form to conform to the spherical surfaces 38 of the rotor and each sun gear at the center of its inner face is recessed as indicated at 43 to receive the adjacent hub 39.

The outer surfaces of the sun gears are of convex spherical form from the hubs thereof to the toothed edges, these surfaces having the same center as the centers for the outer faces or surfaces of the planet gears so that when the sun gears are meshed with the planet gears the outer surfaces of all form a substantial part of a complete sphere.

The rotor 34 has four abutment extensions 44, each having conical ends 45 presented to and inclined as the teeth of the sun gears and concave curved sides 46 which are fitted to the planet gears. The radial faces of the abutments 44 are spherical and flush with the external spherical faces or surfaces of the sun and planetary gears.

The rotor and the gears are enclosed within a case which is generally designated 47. This case is split in two equal halves which are bolted together at a diametrical plane normal to the axis of the rotor, by the bolts 48. The two halves of the case are of unlike form and are accordingly designated by the two separate reference characters 49 and 50.

The halves of the rotor case have formed integral therewith the radially extending hub sleeves 51 which are mounted in the bearings 32 for rotation and which have extending therethrough the sun gear hubs 42 as shown.

As is also clearly shown in Figure 1 there is formed around the inner end or base of each hub sleeve 51, a flat annular shoulder 52 against which bears the inner race of the adjacent bearing unit 32. It will accordingly be apparent that the ring nut 33 which maintains the bearings 32 in position, holds such bearings against the shoulders 32 so that end play of the mechanism is effectively prevented.

The numerals 53 designate the inner ends of the wheel axles. Each of these axles at its inner end is suitably splined as indicated at 54 for engagement with spline grooves formed within the hubs of the sun gears into which hubs the ends of the axles extend. Accordingly it will be seen that the sun gears and the adjacent axles are coupled for unitary rotation.

One of the two halves of the rotor casing, here shown as the half designated 49, has formed integral therewith the encircling flange 55. Encircling the rotor casing and positioned against the inner side of the flange 55 is a ring gear 56 which is secured to the flange by the cap screws 57. This ring gear is in mesh with the pinion 15 and accordingly it will be apparent that when the pinion is rotated corresponding rotation will be given the ring gear 46 to turn the rotor casing in the bearings 32.

The quadri-radiate pins 35 are of a length to extend beyond the outer faces of the planet gears through which they pass and the meeting edges of the two halves of the rotor casing are suitably recessed to receive the outer ends of the pins as shown in Figures 1 and 5. Thus it will be seen that the rotor body 34 and the casing 47 are coupled together so that they must at all times turn as a unit on the rotary axis which is common to the rotor hubs 39 and the wheel axles 53.

Each of the pins 35 is provided with the axial bore 58 which opens at its inner end into the rotor chamber 40 and is enlarged at its outer end as indicated at 58'. Within the enlarged outer end portion 58' of two of the pins is mounted an inwardly opening check valve 59 which comprises a spring 60 disposed in the inner end of the part 58' of the passage and a ball 61 which is positioned against the outer end of the spring and engages in the central bore or passage 62 of the tubular plug 63.

The check valves in the other two pins 35 are outwardly opening valves and are designated generally by the numeral 64. Each of these outwardly opening valves comprises a tubular plug 65 which is threaded into the outer end of the pin and against the inner end of which rests a spring 66. The inner end of the spring engages a ball 67 which engages in and closes the adjacent outer end of the aperture 58. Thus it will be seen that two of the pins have outwardly opening check valves in their outer ends and the other two have inwardly opening check valves.

It will be seen upon reference to Figure 1 that the pins 35 may be brought into alignment with the housing opening 24 and when one of the pins carrying the inwardly opening check valve 59 is brought into such position a grease gun may be coupled with the outer end of the pin and grease or oil forced through the pin into the chamber 40 to fill the latter. Excess oil forced into the chamber will find escape through one of the two pins which has the outwardly opening check valve 64 in its outer end.

Adjacent to each of the four corners of each of the four abutments 44 there is formed a pump port in the body of the rotor which is generally designated 68. Figure 7 shows the details of such port on an enlarged scale and it will be understood that each of the pump ports is of the same design or construction as shown in Figure 7. Since the outer ends of these pump ports 68 open through the spherical surface 38a of the rotor at a corner of an abutment it will be readily apparent that it opens into an angle formed between the adjacent converging toothed portions of a sun gear and a planet gear and the corner of the abutment and accordingly when the planet gears are rotating on their respective pins 35 fluid will be drawn outwardly from the reservoir chamber 40 through two diametrically positioned ports adjacent to the planet gears and forced back into the chamber 43 through the other two diametrically positioned ports adjacent to the same gear.

Upon reference to Figure 7 it will be seen that each pump port has an enlarged outer end or chamber 69 which merges with a reduced outflow passage 70 at its inner end where a ball valve seat 71 is formed. This passage 70 forms the suction passage through which fluid is drawn from the reservoir 40.

Leading from the chamber 69 at one side of the ball valve seat 71 and by-passing the suction passage and opening into the reservoir chamber 40 is a fluid inflow passage 72 of smaller diameter than the outflow passage 70 which latter passage forms the outlet leading to the pump port chamber 69.

Within the chamber 69 and resting in the seat 71 is a ball 73 and secured in the outer end of the chamber 69 is a spider 74 which maintains in position against the ball 73, the spring 75 which constantly urges the ball 73 against the seat 71. Thus it will be seen that outward suction upon the chamber 69 will draw fluid outwardly through the discharge outflow passage 70 and through the smaller passage 72, the ball 73 being unseated by such action whereas fluid forced into the chamber 69 will be able to get back to the rotor fluid reservoir chamber 40 only by way of the small or restricted return flow passage 72.

In order to prevent the fluid being forced between the outer faces of the sun gears and the abutting inner surface of the casing to and through the hollow hubs 51 of the casing sections, the sun gears are provided with the oblique drain orifices 76 adjacent to the inner end or root of the hub portion 42 and the outer ends of these orifices are connected together by the channel or groove 77 formed in the outer convex surface of each sun gear around the hub 42. The inner ends of the orifices 76 open into the recess 43 into which the adjacent hub 39 of the rotor fits. Thus it will be seen that any fluid which is forced by the gears between the opposing wall surfaces of the casing sections and the sun gears will be collected in the channel 77 and carried back into the reservoir chamber 40. Should any fluid work past the channel 77 it will be held back by the packing 77' which encircles the outer end of the gear hub 42 and is compressed against the end of the adjacent hub sleeve 51 by the ring 51'.

From the foregoing it is believed that the operation of the present positive drive differential mechanism will be readily apparent. When power is applied to the pinion shaft 14 to turn the pinion 15 and the ring gear 56, if the wheels which are connected with the axles 53 are resting upon a surface where the same amount of traction can be had for each, the entire unit which includes the casing 47, the gears and rotor therein, will turn in the bearings 32 and corresponding rotation will be given the axles 53. If one or the other of the wheels engages a surface or material where it will lose traction the planet gears 37 will move or roll around the toothed periphery of the sun gear connected with the other axle for the axle carrying wheel having more positive traction and tend to turn faster than that sun gear connected with the wheel and axle which is losing traction. Excessive speeding up of the wheel and axle which is losing traction will be prevented, however, by the functioning of the rotating planet gears as pumps to draw fluid from the reservoir chamber 40 through certain of the suction passages 70 to the outer surface of the rotor and return it through other pump ports by way of the smaller return flow passages 72 into the rotor fluid reservoir chamber 40.

It is here pointed out that the passages 70 and 72 at one time function together as fluid outflow ports from the reservoir chamber 40. This time at which the passages contribute to the passing of fluid outwardly is in the performance of the sucking action or fluid drawing out action caused by the parting of the teeth of the meshed planet and sun gears. In other words, those passages 70 and 72 which during the relative rotation of the sun and planet gears are adjacent to the gear teeth which are moving out of mesh or parting, will have fluid drawn out therethrough from the reservoir chamber.

Due to the fact that these meshed sun and planet gears are required to reverse their rotation according to which of the wheels is slipping and which has the more positive traction, the chambers 69 become either exhaust or intake chambers. In other words, where the teeth of the sun and planet gears are moving out of mesh, as above stated, fluid will be drawn out from the reservoir chamber 40 through the adjacent passages 70 and 72 into and discharged outwardly from the chamber 69 and at the opposite sides of the gears where the teeth are moving into mesh the fluid is pumped into the chamber 69 on that side and is forced only through the smaller flow restricting passage 72 which at its inner end provides the inlet port to return the fluid to the reservoir chamber 40.

Because of this restriction of the flow of fluid back to the central reservoir chamber 40, a resistance to the free rotation of the gears is set up and the slipping action of the wheel without traction is reduced and a positive driving torque is delivered to the wheel having traction.

It is believed that it will be readily apparent that the herein described differential mechanism will function in the necessary manner and in a manner corresponding to a conventional differential when the vehicle in which the mechanism is installed is rounding a curve. Under these conditions the outside wheel will naturally rotate faster than the inside wheel. However the slight amount of differential action necessary under such conditions will not be great enough to build up an opposing hydraulic resistance in the rotor unit since the movement of the fluid will be very slow and may readily flow through the small passages 72.

I claim:

1. A fluid differential comprising a closed casing, means supporting the same for rotation, a chambered body within the casing and adapted to contain and form a reservoir for a quantity of fluid, opposite sun gears rotatably supported between the body and the casing, planet gears rotatably supported between the body and the casing and between and coupling the sun gears, aligned axles at opposite sides of the casing and each coupled with a sun gear to turn therewith, the sun gears, axles and chambered body being adapted to turn as a unit on the axis of rotation of the casing, the sun and planet gears coacting to function as pumps when relatively rotated, suction passages by which fluid may be withdrawn by the pumps from the body reservoir, return flow passages of smaller diameter than and joining at one end with the suction passages by which fluid drawn from the reservoir through certain of the passages is returned by the pumps to the chamber, check valves preventing reverse flow of fluid into the reservoir through the suction passages, and means for applying driving power to the casing to turn the same on its axis of rotation.

2. A differential of the character stated, in combination with two spaced, coaxial axles, a ring gear supported for rotation coaxially with the axles, two spaced sun gears each secured to and rotatable with an axle, planet gears connecting the sun gears, supporting means for the planet gears connected to the ring gear to turn unitarily therewith and also for turning independently on axes perpendicular to the ring gear, a fluid reservoir, passages of different diameters connected with the reservoir whereby the planet gears cooperate with the sun gears to function as pumps upon differential rotation of the gears to withdraw fluid from the reservoir through passages of one diameter and return the fluid to the reservoir through passages of smaller diameter, and check valves for the said passages of one diameter preventing reverse flow of fluid therethrough into the reservoir.

3. A fluid differential comprising a differential housing, a pair of spaced axially aligned bearings mounted within the housing, a casing having opposite tubular hubs mounted in said bearings for rotation, means for imparting rotary motion to the casing, a pair of spaced opposed sun gears within the casing, each sun gear including a hub portion extending through a tubular hub of the casing, a hollow body disposed within the casing between said sun gears, the hollow body being adapted to contain and form a reservoir for a fluid, coupling means between the hollow body and the casing, planet gears disposed between the hollow body and the casing and coupling the sun gears, the planet gears being supported for rotary movement on the hollow body, axles connected with the sun gear hubs to rotate therewith, said planet gears cooperating with the sun gears to function as pumps upon differential movement of the gears, said hollow body having outflow passages leading from the hollow interior outwardly and having other passages communicating with the interior thereof and adapted to function at one time with the outflow passages to pass fluid outwardly and at another time as inflow passages, the said other passages being of smaller diameter than the outflow passages, check valves for the outflow passages preventing reverse flow of fluid therethrough, and said pumps acting upon differential rotation of the gears to withdraw fluid from the hollow body past said check valves through certain of the outflow passages and certain of the other passages and return the fluid into the hollow body through only the said certain of said other passages of smaller diameter.

4. A fluid differential of the character stated in claim 3, wherein the said coupling between the hollow body and the casing comprises a plurality of pins carried by the hollow body and extending outwardly through the casing, the planet gears rotating on said pins, and means for injecting fluid into the hollow body through one of said pins.

5. A fluid differential comprising a housing, a pair of spaced coaxial bearings supported within the housing, a substantially spherical casing having opposite tubular hubs, said hubs being mounted in said bearings for the free rotation of the casing, means for imparting rotation to the casing, the interior wall of the casing being of substantially spherical form, a pair of spaced opposed sun gears within the casing, each sun gear having a hub portion extending through a tubular hub of the casing for free rotation therein, said sun gear hubs each being adapted to have an axle coupled therewith, a rotor body disposed within the casing and having opposite spherical surfaces between which and the inner surface of the casing the sun gears are held for rotation, a plurality of radial pins carried by said rotor body and extending outwardly through the casing wall along lines perpendicular to the rotary axis of the casing, a planet gear rotatably mounted on each pin between and having toothed coupling with the sun gears, said rotor body including outwardly projecting abutments disposed around the rotor body in the plane of the pins and each positioned between a pair of planet gears and having curved opposite faces across which the teeth of two adjacent planet gears move, said abutments each having two other curved faces across which the teeth of the sun gears move, the rotor body having a central fluid reservoir chamber, the planet and sun gears cooperating to function as pumps upon differential rotation of the gears, and pump chambers in and opening at one end through the outer surface of the rotor body, each pump chamber being located at a corner of an abutment, the rotor body having two passages leading from the other end of each pump chamber into the reservoir chamber, one of said passages constituting an outflow passage through which fluid is drawn outwardly by a pump and the other passage functioning at one time to pass fluid outwardly from the reservoir and at another time to permit fluid to be moved inwardly by a pump, the said other passage being of smaller diameter than the outflow passage, and an outwardly opening check valve controlling each outflow passage only.

6. A fluid differential of the character stated in claim 5, wherein a pin of the rotor body has an axial bore formed therethrough, and a check valve in said bore facilitating the introduction of fluid through the bore into the rotor body chamber.

7. A fluid differential of the character stated in claim 5, wherein each of the said rotor body pins has an axial bore therethrough leading from the outer end into the fluid chamber, an inwardly opening check valve in the bores of certain of the pins, and an outwardly opening check valve in the bores of the remaining pins.

8. A fluid differential of the character stated in claim 5, wherein each of said bearings includes a removable anti-friction unit encircling a tubular hub of the casing and a fixed portion in which the removable unit is mounted, each tubular hub being encircled by a flat shoulder against which a portion of the removable bearing unit engages, and a ring nut threaded into the fixed portion of the bearing structure upon the opposite side of the removable unit from said shoulder and engaging and maintaining the removable unit in position.

References Cited in the file of this patent

UNITED STATES PATENTS

| | | |
|---|---|---|
| 1,529,942 | Bradley | Mar. 17, 1925 |
| 2,463,091 | Dortout | Mar. 1, 1949 |
| 2,627,190 | Bottcher | Feb. 3, 1953 |
| 2,737,063 | Thomas | Mar. 6, 1956 |

FOREIGN PATENTS

| | | |
|---|---|---|
| 696,445 | Germany | Sept. 21, 1940 |
| 698,302 | Germany | Nov. 7, 1940 |